United States Patent [19]

Takeuchi et al.

[11] Patent Number: 5,261,103

[45] Date of Patent: Nov. 9, 1993

[54] METHOD OF AND SYSTEM FOR COMPILING SOURCE PROGRAM

[75] Inventors: Satoshi Takeuchi, Yokohama; Yoshimasa Kanamori, Ishikawa, both of Japan

[73] Assignees: Hitachi, Ltd., Tokyo; Hitachi Software Engineering Co., Ltd., Kanagawa, both of Japan

[21] Appl. No.: 865,625

[22] Filed: Apr. 9, 1992

Related U.S. Application Data

[63] Continuation of Ser. No. 391,021, Aug. 9, 1989, abandoned.

[30] Foreign Application Priority Data

Sep. 12, 1988 [JP] Japan .................. 63-226371

[51] Int. Cl.⁵ .......................................... G06F 15/38
[52] U.S. Cl. ........................... 395/700; 364/DIG. 1; 364/280.4; 364/280.7
[58] Field of Search ..................... 395/650, 700

[56] References Cited

U.S. PATENT DOCUMENTS 4,712,189  12/1987  Mohri ...................... 364/900
4,791,558  12/1988  Chaitin et al. ............ 395/500
4,905,138  2/1990  Bourne ..................... 364/200

FOREIGN PATENT DOCUMENTS 2309929  4/1975  France .
2130406  5/1984  United Kingdom .
0142735  5/1985  United Kingdom .

*Primary Examiner*—Gareth D. Shaw
*Assistant Examiner*—John Q. Chavis
*Attorney, Agent, or Firm*—Antonelli, Terry, Stout & Kraus

[57] ABSTRACT

A method of and system for compiling a source program, in which a translator translates source programs into executable programs and generates a name table and a name mutual reference information table that contain names used in the source programs. A text editor edits the source program to-be-compiled on the basis of information in a displayed name mutual reference table obtained from information in the name table and the name mutual reference information table. By selectively designating a part necessary for the editing, from within the displayed name mutual reference table, and then starting the text editor, it is possible to efficiently perform operations from the generation of the name mutual reference table for the names used in the source programs, to effect editing of the source program.

6 Claims, 8 Drawing Sheets

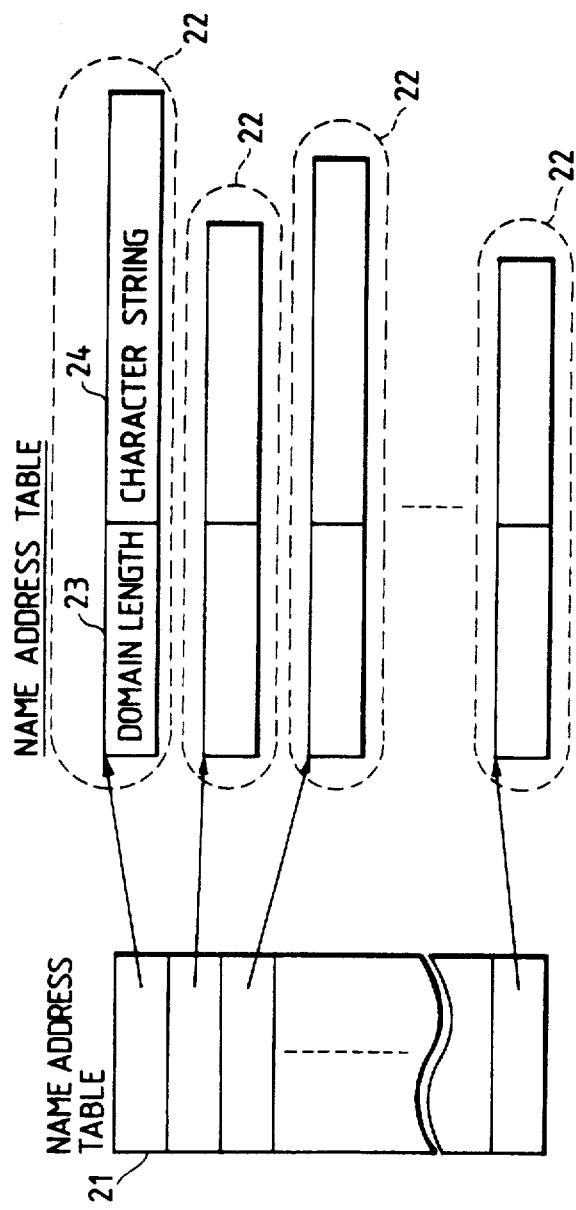

FIG. 4
NAME MUTUAL REFERENCE TABLE

| NAME (41) | CLASSIFICATION (42) | FILE NAME (43) | MARK (44) | LINE NUMBER (45) |
|---|---|---|---|---|
| | | | | |
| | | | | |
| | | | | |
| | | | | |

FIG. 5
LINE NUMBER INFORMATION TABLE

| FILE NAME (51) | LINE NUMBER (52) | NAME (53) |
|---|---|---|
| --- | --- | --- |

FIG. 6

EDIT SCREEN FORM OF SOURCE PROGRAM

| | | SELECT |
|---|---|---|
| | 1 | /*BRAWSER USE EXAMPLE*/ |
| | 2 | (RULE 1 |
| | 3 | IF |
| | 4 | (SLOT 1 OF FRAME 1 IS SELECTED) |
| | 5 | |
| | 6 | (SEND FRAME 2 ASSIGN (SLOT 2,1) |
| | 7 | ASSIGN (SLOT 3,2) |
| | 8 | (WRITE PRIVATE MEMO (STATUS IS [SELECT],1,0)) |
| | 9 | ) |

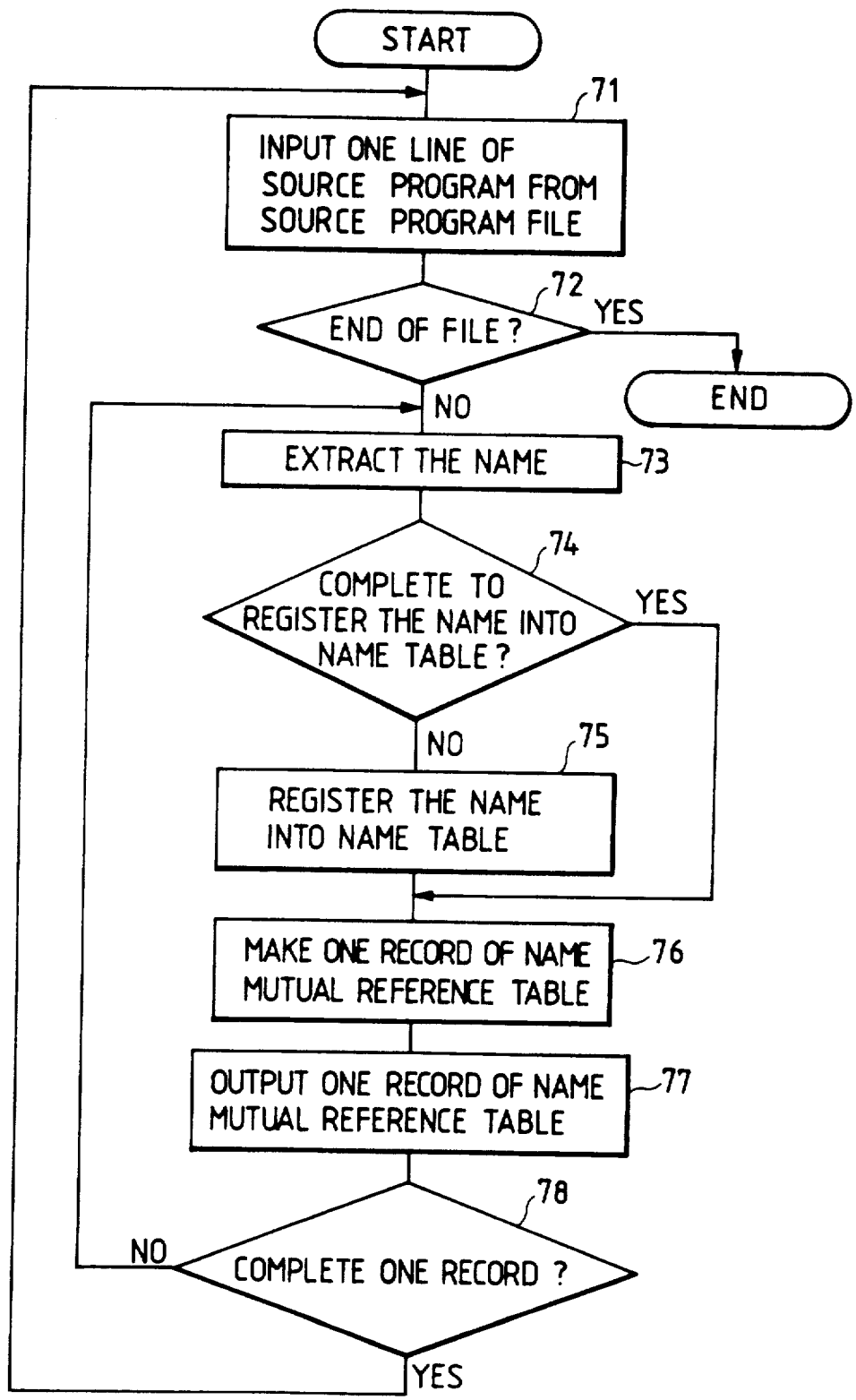

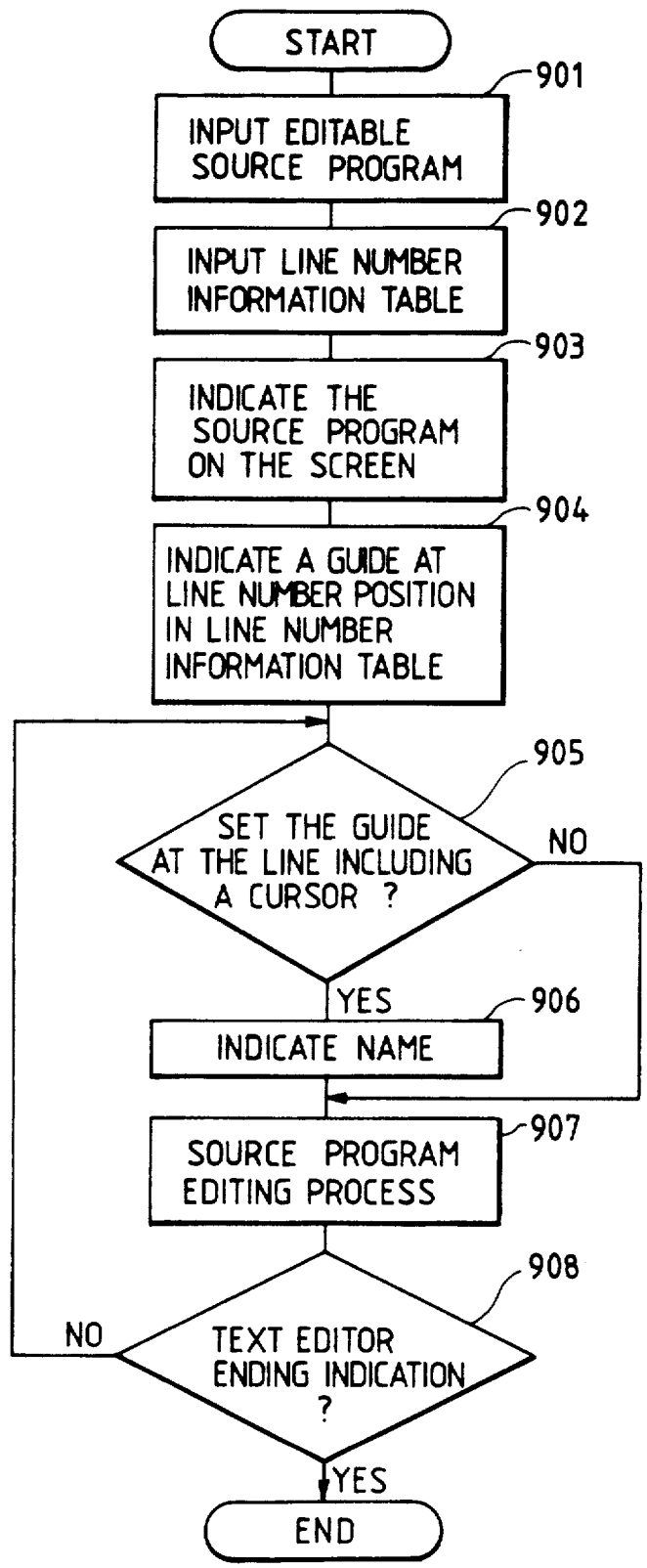

METHOD OF AND SYSTEM FOR COMPILING SOURCE PROGRAM

This application is a continuation application of Ser. No. 391,021, filed Aug. 9, 1989, now abandoned.

BACKGROUND OF THE INVENTION

The present invention relates to the compilation of a source program in an expert system, and more particularly to a source program compiling method and system which are well suited to specify a source program to-be-compiled on the basis of names used in the source program.

As a source program compiling method of this type, there has heretofore been known one wherein the mutual reference relations of names (a program name, a file name, data names, procedure names/paragraph names, etc.) used in each source program are merely output to a printer or the like in the form of a mutual reference list, as stated in, for example, "Manual on Use of Program Product VOS3 COBOL (8090-3-855)", pp. 87-91.

In the prior art mentioned above, the mutual reference relations of the names used in the source programs are merely output to a printer, and it is not considered at all that a file which stores any source program is compiled using the mutual reference list. In the compilation, a user must examine the file in which the source program is stored, before an editing operation is performed by separately starting a text editor. Therefore, operations before the editing operation have been complicated and inefficient.

By way of example, in a case where the user has entered an input erroneously, it is a very difficult job requiring a long time to examine the file storing the source program therein each time so as to search out a place corresponding to the erroneous input. In this regard, if such a place of erroneous input can be found in a short time, the efficiency of the compilation including the correction of the place will be enhanced.

SUMMARY OF THE INVENTION

It is accordingly an object of the present invention to realize the efficient performance of operations from the generation of a names mutual reference table to names used in source programs, to the editing of any source program.

In order to accomplish this object, a system for compiling a source program according to the present invention uses a translator which translates source programs into executable programs, and a text editor which edits any source program, and operates to generate a name table and an name mutual reference information table by means of the translator, and generate a name mutual reference table on the basis of the name table and the name mutual reference information table. In addition, the name mutual reference table is displayed by a display (a display unit), and the text editor is started while a place to-be-edited in the displayed name mutual reference table is selectively designated.

Concretely, the name mutual reference table is used for generating a line number information table which contains the file name, line numbers and names of a file selectively designated for the place to-be-edited, and a display indicative of the place to-be-edited, for example, a guide is presented at a predetermined position on a source program editing screen obtained by starting the text editor, that is, at the position of the corresponding line number in the line number information table.

Operations based on the above construction will be described.

The translator which translates the source program to-be-compiled into the executable program generates the name mutual reference information table and the name table. A browser generates the name mutual reference table written in concrete character strings, on the basis of the name mutual reference information table and the name table, and this name mutual reference table is displayed on the display unit. Upon viewing the display on the screen, a user selectively designates the place to-be-edited such as a name in which an erroneous input has been involved. The line number information table which holds the file name, line numbers and names of the file selectively designated is generated, and the position of the corresponding line number in the line number information table is appointed by the guide on the source program editing screen afforded by the text editor. The appointed place is edited by, entering a correctional input, for example.

In the name mutual reference table, names and file names are contained in a state in which they are restored into the character strings in the original source program. In view of this table, the user can easily find erroneous inputs such as the error of any name and the ommision of any file name.

The browser starts the text editor toward the file which has been selected and designated by the operator and in which the source program requiring the editing is stored. In the way stated above, the text editor appoints the place to-be-edited on the source program editing screen. Moreover, if necessary, the text editor indicates a name corresponding to the line, at which the guide is presented, at the upper part of the screen when a cursor is located at this line. Thereafter, the required editing is carried out.

BRIEF DESCRIPTION OF THE DRAWINGS

FIG. 2 is a diagram showing an example of the format of a name table which a translator generates;

FIG. 3 is a diagram showing an example of the format of a name mutual reference information table which the translator generates;

FIG. 4 is a diagram showing an example of the format of a name mutual reference table which a browser displays on a display unit;

FIG. 5 is a diagram showing an example of the format of a line number information table which the browser generates;

FIG. 6 is a diagram showing an example of the format of a source program editing screen which a text editor displays on the display unit;

FIG. 7 is a flow chart showing the operation of the translator according to the present invention;

FIG. 9 is a flow chart showing the operation of the text editor according to the present invention.

DESCRIPTION OF THE PREFERRED EMBODIMENTS

Now, embodiments of the present invention will be described in detail with reference to the drawings.

Figure 1:
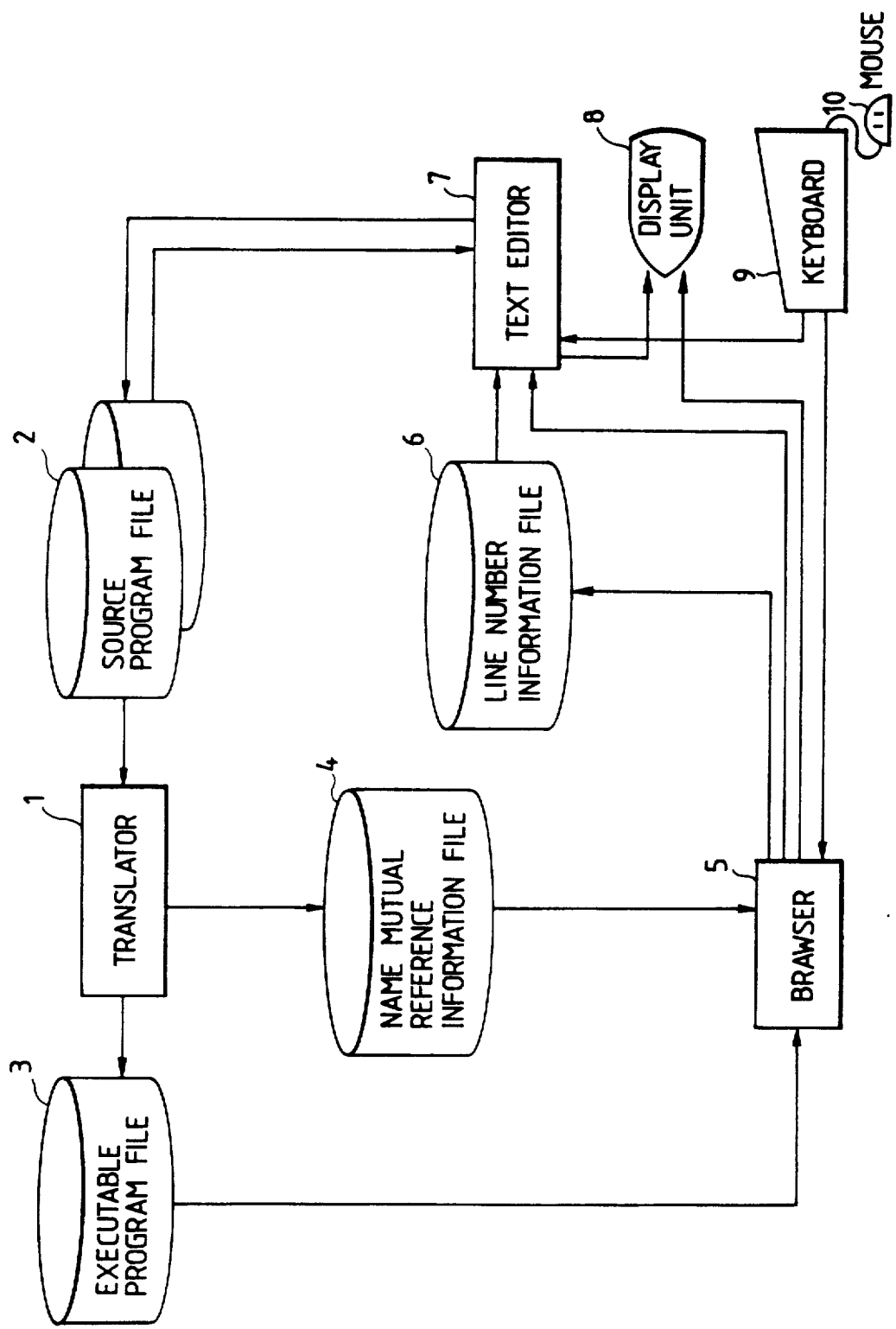
FIG. 1 is a schematic block diagram of a system which permits a source program file to be edited by starting a text editor after the generation of a name mutual reference table in accordance with the present invention.

In order to draw an intended inference at high speed, a translator 1 in FIG. 1 receives source programs (programs in a language described by a user) from source program files 2 and converts them into executable programs, which are delivered to an executable program file 3. As usual, the executable programs are executed by an inference engine not shown. Further, the translator 1 brings the mutual reference relations of names used in the source programs, into a format (to be described later with reference to FIG. 3) which a browser 5 can receive, and then delivers this information to a name mutual reference information file 4 in order that the browser 5 may be permitted to generate a name mutual reference table. The browser 5 receives the outputs of the executable program file 3 and the name mutual reference information stored in file 4 by the translator 1, and displays the name mutual reference table (to be described later with reference to FIG. 4) of the names used in the source programs, on a display unit 8. Here, an operator instructs the browser 5 of a name and a file name noticed in the name mutual reference table displayed on the display unit 8, by the use of a keyboard 9 or a mouse 10. The browser 5 supplies a line number information file 6 with information on the number of a line at which the instructed noteworthy name is described in the file 2 designated by the operator. Further, the browser 5 starts a text editor 7 under the condition that the file appointed by the operator is an object to-be-edited. The text editor 7 started by the browser 5 receives the source program file specified by the browser 5 among the source program files 2, and displays it on the display unit 8. Further, the text editor 7 receives the output of the line number information file 6 and functions to present the display with a guide affixed to the noteworthy line. In accordance with an instruction from the keyboard 9 or the mouse 10 by the operator, the text editor 7 locates a cursor at that corresponding line in the source program at which the guide is set.

The operator corrects the source program as may be needed, and instructs the text editor 7 to store the source program in the source program file 2. In accordance with the instruction, the text editor 7 stores the corrected source program in the source program file 2.

FIG. 2 shows a table (termed "name table") which is delivered to the executable program file 3 together with the executable programs by the translator 1 in FIG. 1 having interpreted the source programs on the basis of a method determined for a user's system. The name table has a table format for holding the names used in the source programs. Here, a name address table 21 is in the format of a unidimensional array which contains the addresses of name domains 22 containing the individual domains, and in which the addresses (numerical values) of the respective name domains 22 are stored in the sequence of the appearances of the name within each source program. Each character string 24 is the very character string that expresses the name used in the source program, and a region 23 contains the length of the character string 24.

FIG. 3 shows the format of a name mutual reference table which the translator 1 in FIG. 1 delivers to the name mutual reference information file 4. The name number at column 31 contains the number of each of the characters used as names in the source programs. The numbers in the column 31 correspond to the element numbers of the array of the new address table 21 in FIG. 2 which contains the addresses of the name domains 22 containing the character strings. The file name number column 32 contains number of each of the character strings which are used as the file names of the files 2 storing the source programs where the names indicated by the name domains 22 are described. The numbers in the column 32 correspond to the element numbers of the array of that name address table 21 in FIG. 2 which contains the addresses of the name domains 22 containing the character strings.

Classification at column 33 contains in terms of numerals, classes (for distinguishing variables, constants, frame names, etc.) clarifying what significances the names indicated by the identifier numbers in column 31 have within the source programs. Line number in column 34 contains the number of a line at which the corresponding name indicated by the name number in the column 31 is described within the source program stored in the file indicated by the file number in the column 32. "1" is set in a definition flag 35 when the corresponding name indicated at the name number in the column 31 is defined by the line indicated by the line number in the column 34 within the source program file which the file name number in the column 32 designates, and "0" is set when not. "1" is set in a reference flag 36 when the corresponding name indicated at the name number in the column 31 is referred to by the line indicated by the line number in the column 34 within the source program file which the file name number in the column 32 designates, and "0" is set when not.

FIG. 4 shows the format of a name mutual reference table (expressive of the correlations between the names and the file names as well as the line numbers) which the browser 5 in FIG. 1 generates on the basis of the name table in FIG. 2 and the name mutual reference table in FIG. 3 and displays on the display unit 8. The browser 5 receives the name mutual reference information table shown in FIG. 3 from the name mutual reference information file 4 and the name table shown in FIG. 2 from the executable program file 3, and functions to present the display upon sorting the various records in terms of the name number in column 31, the classification in column 33 and the file name number in column 32. In the display, name at column 41 corresponds to the name number in the column 31, classification 42 corresponds to the classification 33, file name 43 corresponds to the file name number in the column 32, and line number in column 45 corresponds to the line number in the column 34. Here, the individual items are displayed after the numerals have been converted into the character strings by the use of the name table in FIG. 2. That is, the names used in the source programs are displayed by the character strings in the column of the names 41, while the file names used in the source programs are displayed by the character strings in the column of the file names 43. This is done for the reason that, since the executable program file 3 is described by only numeral strings which cannot be understood by the user, the display is presented in the form of the character strings which can be understood by the user. Incidentally, a mark at column 44 is provided for a "1" of the definition flag 35 so as to signify that the corresponding name is defined.

Upon viewing the displayed name mutual reference table (FIG. 4), the user or operator can clearly observe the error of any source program input, for example, the state in which a name is not properly displayed or in which a file name corresponding to a certain name is omitted, and hence, he/she can immediately find out the erroneous input. Then, the operator selectively appoints such a name, file name, or line number thought to be the error to the browser 5 through the keyboard 9 or mouse 10.

FIG. 5 shows the format of a line number information table which the browser 5 in FIG. 1 delivers as an output to the line number information file 6, and also to the text editor 7 in accordance with the selective appointment described above.

Referring to FIG. 5, in the delivery of the output, the file name 43 corresponds to file name 51, line Nos. at numerals 48 and 49 for a file name 46 in FIG. 4 correspond to line No. at numeral 52, and a name 47 in FIG. 4 corresponds to name 53. By the way, the file names in the column 51 and the names in the column 53 are delivered in the form of character strings similarly to the file names in the column 43 and the names in the column 41.

FIG. 6 shows an example of the source program editing screen which the text editor 7 in FIG. 1 displays on the display unit 8, in the case where the operator has designated the character string selected as the noticed name. Numeral 61 denotes the line numbers of the source program, numbers 62 denote guides. (for example, underlines) corresponding to the line numbers in the column 52 in FIG. 5, and numeral 63 denotes a cursor which can be moved at will. In FIG. 6, the very character strings of the source program are displayed on the right sides of the line numbers of the source program at numeral 61. The guides 62 are displayed at all lines at which the noticed name appears (in this example, all lines which contain the name "select"). In a case where the cursor 63 lies on the guide 62, the noticed name 53 (in FIG. 5 ) is displayed by the character string of larger size in a column 64. In this manner, according to the format of FIG. 6, the source program is displayed as it is, and those places in the displayed screen which the user or operator notices are indicated by the guides, so that an erroneous input, for example, can be readily found. Then, the operator corrects the corresponding parts into a proper input through the text editor 7.

FIG. 7 is a processing flow chart of the translator 1 in FIG. 1. At a step 71, one line of the source program is received as an input from the source program file 2. At a step 72, it is determined if the source program files 2 have been received.

When the source program files 2 have not been received, the step 72 is followed by a step 73, and when they have been received, the processing is ended. At the step 73, a name is extracted from the input source program. A step 74 checks if the extracted name is registered in the name table shown in FIG. 2. When it is registered, the flow shifts to a step 76, and when not, the flow shifts to a step 75. At the step 75, the name extracted at the step 73 is registered into the name table in FIG. 2. The step 76 generates one record of the name mutual reference information table in FIG. 3 concerning the name extracted at the step 73. At a step 77, one record of the name mutual reference information table made at the step 76 is delivered as an output to the name mutual reference information file 4. A step 78 decides if one record of the source program received at the step 71 has been processed. When the processing of one record has ended, the flow shifts to the step 71, and when not, the flow shifts to the step 73.

Figure 8A:
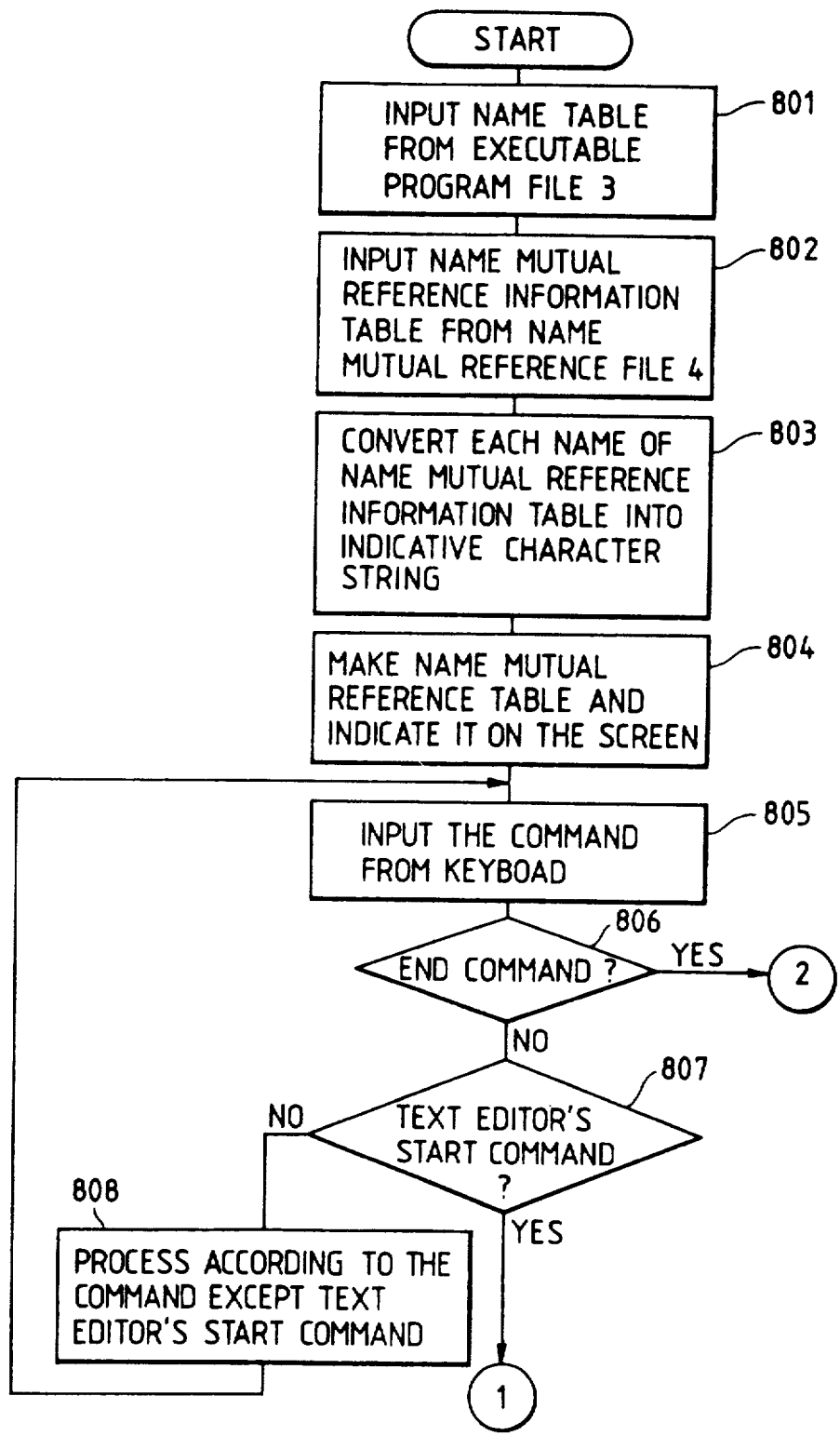
FIGS. 8(*a*) and 8(*b*) are flow charts showing the operation of the browser according to the present invention.
Figure 8B:
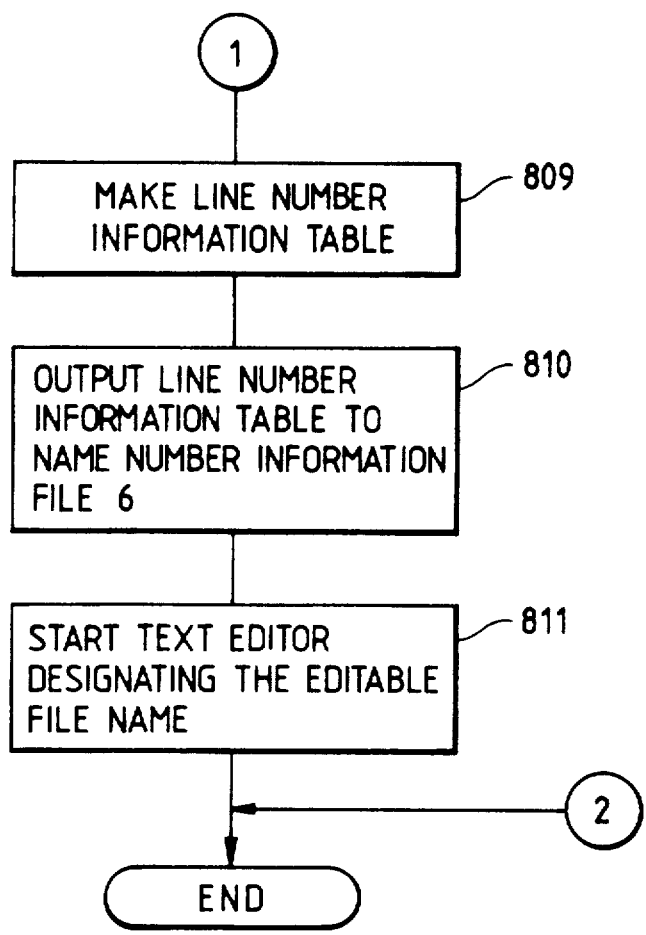

FIGS. 8(a) and 8(b) are processing flow charts of the browser 5 in FIG. 1. At a step 801, the name table shown in FIG. 2 is received as an input from the executable program file 3. At a step 802, the name mutual reference information table shown in FIG. 3 is received as an input from the name mutual reference information file 4. At a step 803, the name numbers in the column 31 and the file name numbers in the column 32 contained in the name mutual information table are converted into character strings which can be displayed in correspondence with the name table. At a step 804, the name mutual reference table in the format shown in FIG. 4 is made and is displayed on the display unit 8. At a step 805, a command is entered as an input from the keyboard 9 or the mouse 10. A step 806 decides if the command entered at the step 805 is an end command, and the processing is ended subject to the end command. When the entered command is not the end command, the processing shifts to a step 807. At the step 807, it is decided if the command entered at the step 805 is a text editor start command. Subject to any command other than the text editor start command, the flow shifts to a step 808. The processing of the browser 5 except for the text editor start command is performed at the step 808, whereupon the flow is shifted to the step 805. When the entered command is the text editor start command at the step 807, the flow is shifted to a step 809. At the step 809, the line number information table in the format shown in FIG. 5 is generated according to the text editor start command. In the case where the text editor start command is entered at the step 805, the text editor 7 is instructed to start in the state in which the column 46 (file name) in the name mutual reference table shown in FIG. 4 and displayed on the display unit 8 is selected. At the step 809, two records of the column 52 in FIG. 5 are generated in correspondence with the line numbers at 48 and 49 in FIG. 4. Likewise, the column 51 is generated in correspondence with the file name 46, and the column 53 in correspondence with the name 47.

At a step 810, the line number information table generated at the step 809 is delivered as an output to the line number information file 6. At a step 811, the text editor 7 in FIG. 1 is started.

FIG. 9 is a processing flow chart of the text editor 7 in FIG. 1. At a step 901, the source program to be edited is received as an input from the source program file 2. At a step 902, the line number information table in the format shown in FIG. 5 is received as an input from the line number information file 6 to which the browser 5 has delivered its output. At a step 903, the source program received at the step 901 is displayed on the display unit 8 in the format shown in FIG. 6. At a step 904, the guides are displayed as shown in FIG. 6, at the positions of the line numbers in the line number information table received at the step 902. A step 905 decides if the guide is set at the line at which the cursor is located, within the source program displayed on the display unit 8 in the format of FIG. 6. When the guide is set, the processing is shifted to a step 906, and when not, the processing is shifted to a step 907. At the step 906, the content of the name 53 corresponding to the line at which the cursor is located within the line number information table in FIG. 5 is displayed in the column 64. The editing of the text editor 7, such as the change of the erroneous input to a correct input, is done at the step 907. A step 908 decides if the text editor 7 is instructed to end its operation. When the end instruction is not given, the processing is shifted to the step 905. When the end instruction is given, the processing of the text editor 7 is ended. According to the source program compiling system of the present invention, owing to the functions described above, the place to-be-edited of a source program can be readily found from the display of a name mutual reference table for the source program, and the editing can be done by a series of operations. Therefore, the invention achieves the effect that the source program can be efficiently compiled.

What is claimed is:

1. In a source program compiling method for use in a system wherein a translator translates source programs into executable programs, and a text editor edits any of said source programs, a source program compiling method comprising the steps of:
   generating a name table and a name mutual reference information table, which comprise names used in said source programs, said name table being a list of names used in said source programs and said name mutual reference information table representing both a line number at which each of said names is described in a particular one of said source programs and a file identification of which of said source programs to which said line numbers belongs corresponding to each name, said name table and said name mutual reference information reference table being generated by said translator;
   storing said name table and said name mutual reference information table;
   generating a name mutual reference table from information in said stored name table and said stored name mutual reference information table; and
   displaying said name mutual reference table for a user's reference, said name mutual reference table representing said line number, said file identification and corresponding name of said particular source program, all in character strings; and
   manually and selectively designating a part of said particular source program by indicating said file identification, said name or said line number from said displayed name mutual reference table; and
   starting said text editor to edit said designated part of said particular source program.

2. A source program compiling method as defined in claim 1, wherein said generated character string name mutual reference table comprises a line number information table having a file name, line numbers and corresponding file names according to said displayed name mutual reference table, and said display for a place to-be-edited at a position corresponding to a line number in the line number information table is provided on a source program editing screen according to said text editor.

3. A source program compiling method as defined in claim 1, wherein said stored name table contains numbers of addresses of names used in said source programs;
   said name mutual reference information table comprises, at least, name numbers corresponding to said numbers of said addresses and file name numbers of files storing said source programs indicated by said name numbers; and
   said displayed name mutual reference table comprises, at least, names in character strings corresponding to said name numbers, file names in character strings corresponding to said file name numbers, and line numbers corresponding to said aforementioned line numbers in said source programs.

4. In a source program compiling system having a translator which translates source programs into executable programs, and a text editor which edits any of the source programs, a source program compiling system, comprising:
   means for generating a name table and a name mutual reference information table which comprise names used in said source programs, said name table being a list of names used in said source programs and said name mutual reference information table representing a both a line number at which a name is described in a particular one of said source programs and a file identification of said particular source program to which said line number belongs corresponding to each name;
   means for storing said generated name table and name mutual reference information table;
   means for generating a reference table using information from said stored name table and said stored name mutual reference information table and for displaying said mutual reference table for a user's reference, said name mutual reference table representing said line number, said file identification and corresponding name of said particular source program all in character strings; and
   means for starting said text editor to edit a part of said source program designated by said user selectively designating said part of said source program by indicating said file identification, said name or said line number from said displayed name mutual reference table.

5. A source program compiling system as defined in claim 4, wherein said means for generating said character string name mutual reference table comprises means for generating a line number information table having a file name, line numbers and corresponding file names according to said displayed name mutual reference table, and wherein said display for a place to-be-edited at a position corresponding to a line number in the line number information table is provided on a source program editing screen according to said text editor.

6. A source program compiling system as defined in claim 4, wherein said stored name table comprises numbers of addresses of said names used in said source programs;
   said stored name mutual reference information table comprises, at least, name numbers corresponding to said numbers of said addresses and file name numbers of files storing said source programs of said names indicated by said name numbers; and
   said displayed name mutual reference table comprises, at least, names in character strings corresponding to said name numbers, file names in character strings corresponding to said file name numbers, and line numbers corresponding to said aforementioned line numbers in said source programs.

* * * * *